Patented Apr. 28, 1925.

1,535,586

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ARC WELDING.

No Drawing. Application filed June 30, 1921. Serial No. 481,620

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Arc Welding, of which the following is a specification.

My invention relates to improvements in arc welding, more especially to means for improving the physical characteristics of welds formed by arc deposition.

It is generally conceded that metal deposited by the metallic electrode arc process is primarily a casting consisting of an aggregate of fused globules. Because of indifferent manipulative skill or incorrect choice of welding materials, welding current, arc length and the like, such cast metal may contain oxide impurities, slag and gas pockets, fissures, slip bands and other defects that tend to reduce its resistance to dynamic or static loads.

There has been general skepticism regarding the strength of arc welded joints and their application and use have been limited to repairs and certain structures in which high mechanical strength is not essential, as it has been generally considered that arc deposited metals were brittle and relatively weak.

My invention obviates these objections, it being among the objects thereof to provide a method for forming welds that shall improve the mechanical and physical properties of the deposited metal, making it strong, ductile and tough.

I have found that arc deposited metal may be greatly improved in physical properties by forging and it is a further object of this invention to provide a method of treating arc welded joints to improve their resistance to fatigue and their general physical properties, such as tensile strength, elastic limit, ductility and hardness.

My process comprises heating the welded joint to a suitable forging temperature, mechanically working the heated metal by applying hammer blow impacts thereto, or by rolling, pressing and the like. Where alloy steel is employed, the joint may be further improved by annealing, heat treating, quenching in oil and drawing.

To forge a welded joint, I heat the arc deposited metal in any convenient manner either in a heating furnace or by forming a carbon arc or a plurality of such arcs between an electrode and the deposit. The weld is heated to a temperature ranging from approximately 1000° F. to 2400°+ F. and is then forged in any desired manner, as by subjecting it to blows delivered by a drop hammer or a manually operated hammer.

The forging operation crushes the grains, mixes them intimately and shortens the cleavage planes in the direction of impact. If the final forging temperature is above the A $C_2$ point or approximately 750° C. (1380° F.), for low carbon material, crystal growth will occur on cooling with a resultant decrease in metal strength. However, if the forging operation is continued below this approximate temperature, the small grain size will be retained and the material will possess the improved physical properties characteristic of forged metal. The forging operation should not, however, be prolonged after the metal has cooled below the red heat as this will produce permanent internal strains and even tearing the metal in the direction of forging.

A series of tests were conducted to determine the improvement produced in welded joints by forging. Arc deposited metal having the following inferior characteristics,

| Ultimate tensile strength. | Elastic limit. | Per cent elongation in 2″. | Per cent reduction in area |
|---|---|---|---|
| Pounds per square inch. | Pounds per square inch. | | |
| 42,187 | 22,125 | 4.6 | 11.4 | was forged at approximately 2300° F., resulting in the following corresponding characteristics:

56,900   28,000   27.6   59.5

High grade low carbon arc deposited metal has been found to have the following average characteristics:

| V. T. S. | Elastic limit. | Per cent elongation in 2″. | Per cent reduction in area. |
|---|---|---|---|
| Pounds per sq. in. | Pounds per sq. in. | | |
| 56,800 | 28,250 | 17.4 | 27.3 |

Upon forging such material at 1600° F. (874° C.) to an approximate final forging temperature of 1350° F. (750° C.) the following corresponding properties were secured:

62,175    44,500    31.3    50.0

It will be observed that a great improvement in elastic limit and ductility has been secured. Similarly, alternating stress tests have shown a very important improvement in fatigue resistance.

A sample welded joint formed of axle steel having an ultimate tensile strength of 67,850 pounds per square inch with an elongation of 9 per cent in one inch of length before forging was improved by forging to an ultimate tensile strength of 72,500 pounds per square inch with an elongation of 23 per cent in one inch length. Another welded joint of the same material made with a nickel steel electrode was hand forged on an anvil and then heat treated by annealing, reheating and quenching in oil. The joint attained an ultimate tensile strength of 83,600 pounds per square inch with an elongation of 23.6 per cent per inch of length. Other heat treated alloy steel welded joints attained an ultimate tensile strength of from 105,000 to 130,000 per square inch. The results obtained indicate that forging increases the strength and ductility of arc deposited metal.

When the metal welded is mild carbon steel, the forged arc welded joints are uniformly stronger than the original metal.

From the above description of my invention, it will be readily seen that treating arc welded joints by my method greatly improves the physical properties thereof. The kneading action of the forging process serves to increase the strength, ductility, density, hardness and resistance to "fatigue" of the metal. Forging imparts to indifferently deposited metal a consistently high tensile strength. The elastic limit of cast arc metal is practically doubled and the properties of elongation and the reduction in area or ductility are greatly increased.

Although I have described a specific embodiment of my invention, it will be obvious to those skilled in the art that various changes may be made in the temperatures, manner of treatment of the welded joints, and ratio of reduction of forged sections in accordance with this invention without departing from the principles herein set forth.

I claim as my invention:—

1. A method of welding which comprises depositing metal by means of an electric arc and then forging the same.

2. A method of welding which comprises depositing metal by means of a fusible electrode, heating said deposit and then forging the same.

3. A method of welding which comprises depositing metal by means of a fusible electrode, heating said deposit to a mechanically workable stage and forging the same.

4. A method of welding which comprises depositing metal by means of a fusible electrode, heating said deposit to a temperature above 1000° F. and then forging the same.

5. A method of welding which comprises depositing metal by means of a fusible electrode, heating said deposit to a temperature ranging between 1000° F and 2400° F. and then forging the same.

6. A method of welding which comprises depositing metal by means of a fusible electrode, heating said deposit to a temperature ranging between 1000° F. and 2400° F., forging and then annealing and heat treating the same.

7. A method of welding which comprises depositing metal by means of a fusible electrode, heating said deposit to a temperature ranging between 1000° and 2400° F., forging the same and then annealing by slow cooling, reheating, quenching and drawing.

8. A method of welding which comprises depositing metal by means of a fusible electrode, heating said deposit to a temperature ranging between 1000° and 2400° F., forging the same and then annealing by slow cooling, reheating and quenching in oil.

9. A welded joint which is of equal or greater strength than the metal from which it is formed, comprising forged arc deposited metal.

In testimony whereof, I have hereunto subscribed my name this 22nd day of June, 1921.

OTTO H. ESCHHOLZ.